Patented May 11, 1943

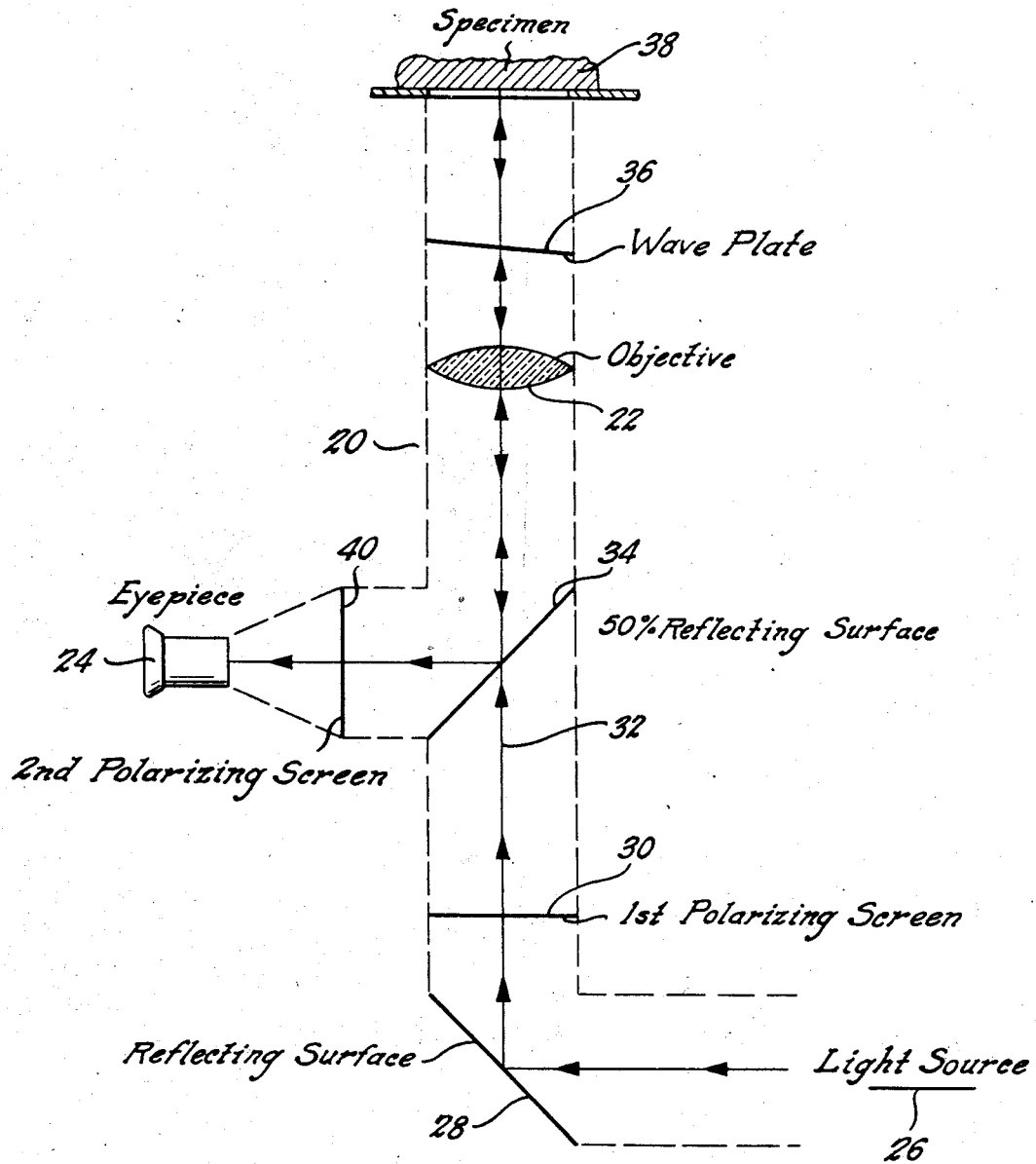

2,318,705

UNITED STATES PATENT OFFICE 2,318,705

METALLOGRAPHIC FILTERING SYSTEM

Harry C. Morgan, Dayton, Ohio, assignor to General Motors Corporation, Detroit, Mich., a corporation of Delaware Application January 9, 1941, Serial No. 373,814

2 Claims. (Cl. 88—39)

This invention relates to optical filters and is particularly concerned with filtering means for removing reflected light from the eye piece of microscopes used for the examination of opaque specimens by normal illumination.

An object of the invention is to provide an apparatus which is adaptable for use on microscopes for the examination of opaque specimens by normal illumination which will filter out reflected light from the objective so that said light does not fog the image.

It is a further object to provide a filtering means for microscopes of the type described comprising two polarizing screens at 90° to one another and disposed on opposite sides of the objective whereby all light passing through the objective is filtered out and then utilizing a 90° wave plate for rotating the plane of reflected light from the specimen only, whereby the reflected image of the specimen is visible in the eye piece.

Further objects and advantages of the present invention will be apparent from the following description, reference being had to the accompanying drawing wherein a preferred embodiment of the present invention is clearly shown.

In the drawing:

The drawing indicates diagrammatically one type of microscope for the examination of opaque specimens by normal illumination and includes the filtering means which is the subject of this invention.

The examination of opaque specimens by normal illumination, presents a distinct problem of clarity in the eye piece when low powered objectives are being used. This is occasioned by the fact that a low powered objective has a large radius of curvature whereby a portion of the reflected light passing therethrough reflects back from the exit side thereof and is picked up by the reflecting surface and directed into the eye piece. This reflected light causes a fog or mist which practically obscures the image of the specimen and in some cases completely obscures the outer edges of the image whereby only a small central portion thereof may be examined. When using high powered objectives with a small radius curvature the reflected light from the objective itself is thrown off at an angle which is sufficiently acute to avoid being picked up by the reflecting surface of the eye piece and for this reason reflected light is not such a great problem when utilizing high powered objectives.

This invention is particularly directed to eliminating this objectionable reflected light in microscopes using low powered objectives and comprises an instrumentation that is suitable for use on any type of microscope used for the examination of opaque specimens by normal illumination.

Referring to the drawing a diagrammatic view of a microscope 20 is shown which includes an objective 22 and an eyepiece 24. A light source 26 is provided which is directed against a reflecting surface 28 placed at a 45° angle thereto, the reflecting surface 28 changes the path of the light beam 90° and reflects the same in an upwardly direction through a polarizing screen 30 which is one of the elements of the filter. The reflected beam of light next passes through a 50% reflecting surface 34 upwardly through the objective 22 and then through a wave plate 36 which is used for rotating the plane of light 45°. The beam 32 next illuminates the specimen 38 whereupon it is reflected downwardly therefrom through the wave plate 36 and objective 22 to the 50% reflecting surface 34. Reflecting surface 34 changes the path of the light beam 90° so that it passes through a second polarizing screen 40 into the eyepiece 24. The screens 30 and 40 and the wave plate 36 are elements which have been injected into the optical system to remove the reflected light to the eyepiece.

The theory of removing this light is as follows: As the illuminating beam passes through the first polarizing screen 30 which is preferably made of "Polaroid," it is plane polarized whereby any reflected light from the objective 22 which passes through the second polarizing screen 40 is eliminated. Since this light has passed through two polarizing screens set at right angles to one another, all light would be eliminated at the eyepiece were it not for the wave plate 36 which rotates the reflected light from the specimen. When using a quarter wave plate 36, the plane of light is rotated 45° upon each passage through the plate 36 which presents a total rotation of 90°. Thus the reflected light from the specimen has been rotated back into the plane of polarization of the screen 40 whereby substantially none of the reflected light from the specimen is filtered out. The wave plate 36 obviously may be in any multiple of a quarter wave plate. The important point being that the plate 36 rotates the plane of light 90° upon double passage therethrough. In this manner, instead of a quarter wave plate it would be possible to use a plate which would rotate the light 270° upon double passage whereby the same results would be obtained etc. The wave plate 36 is preferably disposed at a slight angle sufficient to cause the incident light reflected therefrom to pass out of the line of reflecting surface 34.

In the foregoing, it is apparent that the apparatus utilized for substantially eliminating reflected light in the eyepiece of a microscope used for the examination of opaque specimens under normal illumination is simple and effective and may be applied to practically any microscope now being used by the addition of two polarizing screens and a wave plate.

While the embodiment of the present invention as herein disclosed, constitutes a preferred form, it is to be understood that other forms might be adopted, all coming within the scope of the claims which follow.

What is claimed is as follows:

1. A microscope for use in the microscopic examination of opaque specimens by normal illumination, comprising; a light source, an objective, an eyepiece, polarizing means consisting of crossed polarizing screens disposed between the light source and the objective and between the objective and the eyepiece, said screens normally being capable of filtering out all light from the light source to the eyepiece, and means consisting of a wave plate interposed between the objective and the specimen for rotating light reflected from a specimen so that said light passes through said second polarizing screen whereby the image of the specimen is visible in the eyepiece and reflected light from the objective is substantially filtered out.

2. A filtering device for use in microscopes for the microscopic examination of opaque specimens by normal illumination, comprising; crossed polarizing screens, one of which is disposed between the light source and the objective and the other being disposed between the objective and the eyepiece, and a wave plate adapted to rotate light passing therethrough 45° disposed between the objective and the specimen whereby the light reflected from the specimen only is visible in the eyepiece and substantially all other reflected light is filtered out.

HARRY C. MORGAN.